(12) United States Patent
Unitt

(10) Patent No.: US 11,636,216 B2
(45) Date of Patent: *Apr. 25, 2023

(54) SYSTEM AND METHODS FOR TAMPER PROOF INTERACTION RECORDING AND TIMESTAMPING

(71) Applicant: NEWVOICEMEDIA LTD., Basingstoke (GB)

(72) Inventor: Ashley Unitt, Basingstoke (GB)

(73) Assignee: VONAGE BUSINESS LIMITED, Basingstoke (GB)

( * ) Notice: Subject to any disclaimer, the term of this patent is extended or adjusted under 35 U.S.C. 154(b) by 122 days.

This patent is subject to a terminal disclaimer.

(21) Appl. No.: 17/155,293

(22) Filed: Jan. 22, 2021

(65) Prior Publication Data

US 2021/0256140 A1  Aug. 19, 2021

Related U.S. Application Data

(63) Continuation of application No. 17/133,243, filed on Dec. 23, 2020, now abandoned, which is a
(Continued)

(51) Int. Cl.
*G06F 21/60* (2013.01)
*H04M 3/42* (2006.01)
*H04L 9/40* (2022.01)
*H04L 9/06* (2006.01)
*H04L 43/106* (2022.01)
(Continued)

(52) U.S. Cl.
CPC .......... *G06F 21/602* (2013.01); *H04L 9/0643* (2013.01); *H04L 43/106* (2013.01); *H04L 45/7453* (2013.01); *H04L 63/08* (2013.01); *H04L 63/12* (2013.01); *H04M 3/42221* (2013.01); *H04L 63/0442* (2013.01); *H04L 63/308* (2013.01); *H04L 2463/121* (2013.01); *H04M 3/51* (2013.01); *H04M 2203/301* (2013.01); *H04M 2203/6081* (2013.01)

(58) Field of Classification Search
CPC ............ G06F 21/602; H04L 2463/121; H04L 43/106; H04L 45/7453; H04L 63/0442; H04L 63/08; H04L 63/12; H04L 63/308; H04L 9/0643; H04M 2203/301; H04M 2203/6081; H04M 3/42221; H04M 3/51
See application file for complete search history.

(56) References Cited

U.S. PATENT DOCUMENTS 5,491,815 A  *  2/1996  Basso ..................... H04L 9/40
                                                 713/502
6,529,602 B1 *  3/2003  Walker .................... H04K 1/00
                                                 380/283
(Continued)

OTHER PUBLICATIONS

Search Query Report from IP.com (dated Jul. 15, 2022) (Year: 2022).*

(Continued)

*Primary Examiner* — Sharon S Lynch
(74) *Attorney, Agent, or Firm* — Galvin Patent Law LLC; Joseph Pagnotta; Brian S Boon

(57) ABSTRACT

A system and method for securely recording voice communications, comprising a network-connected computer server and an authentication system which verifies the validity of voice communications.

8 Claims, 13 Drawing Sheets

Related U.S. Application Data continuation of application No. 16/425,692, filed on May 29, 2019, now abandoned, which is a continuation of application No. 16/351,023, filed on Mar. 12, 2019, now abandoned, which is a continuation of application No. 15/839,159, filed on Dec. 12, 2017, now Pat. No. 10,229,275, which is a continuation of application No. 15/414,581, filed on Jan. 24, 2017, now Pat. No. 9,842,216, which is a continuation of application No. 14/970,713, filed on Dec. 16, 2015, now Pat. No. 9,553,982, which is a continuation-in-part of application No. 14/170,468, filed on Jan. 31, 2014, now abandoned, which is a continuation of application No. 13/936,146, filed on Jul. 6, 2013, now abandoned.

(51) Int. Cl.
*H04L 45/7453* (2022.01)
*H04M 3/51* (2006.01)

(56) References Cited

U.S. PATENT DOCUMENTS

| | | | | |
|---|---|---|---|---|
| 6,895,507 | B1* | 5/2005 | Teppler | H04L 9/3263 726/19 |
| 6,898,709 | B1* | 5/2005 | Teppler | H04L 9/3263 713/178 |
| 6,987,841 | B1* | 1/2006 | Byers | H04M 3/42221 379/93.01 |
| 7,848,510 | B2* | 12/2010 | Shaffer | H04M 3/523 709/227 |
| 7,861,088 | B1* | 12/2010 | Brothers | H04L 9/3297 713/168 |
| 8,428,227 | B2* | 4/2013 | Angel | G10L 15/26 379/88.25 |
| 8,577,803 | B2* | 11/2013 | Chatterjee | G06Q 20/326 705/41 |
| 8,713,056 | B1* | 4/2014 | Wongkar | G06F 16/13 707/786 |
| 8,732,462 | B2* | 5/2014 | Bhathena | H04L 63/061 713/168 |
| 9,443,108 | B1* | 9/2016 | Roth | G06F 21/70 |
| 9,703,986 | B1* | 7/2017 | Ashley | H04L 63/126 |
| 2002/0095601 | A1* | 7/2002 | Hind | H04L 9/3247 713/176 |
| 2005/0004899 | A1* | 1/2005 | Baldwin | G06F 21/552 |
| 2005/0027985 | A1* | 2/2005 | Sprunk | H04L 63/12 379/900 |
| 2006/0080536 | A1* | 4/2006 | Teppler | H04L 9/3218 713/176 |
| 2007/0036283 | A1* | 2/2007 | Shaffer | H04M 3/523 379/67.1 |
| 2007/0064905 | A1* | 3/2007 | Mizutani | H04M 1/6505 379/207.03 |
| 2007/0106510 | A1* | 5/2007 | Hsing | G16H 40/67 705/3 |
| 2007/0274293 | A1* | 11/2007 | Forbes | H04L 65/1083 370/352 |
| 2010/0031039 | A1* | 2/2010 | Ciet | H04L 9/3242 713/168 |
| 2010/0235285 | A1* | 9/2010 | Hoffberg | G06Q 20/308 705/37 |
| 2010/0317420 | A1* | 12/2010 | Hoffberg | G06Q 30/0282 463/1 |
| 2011/0286584 | A1* | 11/2011 | Angel | H04M 3/42221 379/88.02 |
| 2012/0011351 | A1* | 1/2012 | Mundra | H04L 9/3242 713/192 |
| 2012/0131331 | A1* | 5/2012 | Benson | H04L 9/3228 713/155 |
| 2012/0310826 | A1* | 12/2012 | Chatterjee | G06Q 20/36 705/41 |
| 2013/0013921 | A1* | 1/2013 | Bhathena | H04L 63/045 713/168 |
| 2013/0114601 | A1* | 5/2013 | Branscomb | H04J 3/0697 370/392 |
| 2013/0276074 | A1* | 10/2013 | Orsini | G06F 21/62 726/5 |
| 2014/0207825 | A1* | 7/2014 | Wongkar | G06F 16/13 707/797 |
| 2014/0280780 | A1* | 9/2014 | Vitale | H04N 21/242 709/219 |
| 2015/0332252 | A1* | 11/2015 | Shahrokhi | G06Q 20/3278 705/41 |
| 2015/0379510 | A1* | 12/2015 | Smith | G06Q 20/3829 705/71 |
| 2016/0162897 | A1* | 6/2016 | Feeney | H04L 9/3247 705/71 |
| 2016/0328713 | A1* | 11/2016 | Ebrahimi | G06K 19/06037 |
| 2017/0075938 | A1* | 3/2017 | Black | H04L 9/3239 |
| 2017/0242475 | A1* | 8/2017 | Gilboa | G06F 1/3237 |
| 2017/0300875 | A1* | 10/2017 | Gilboa | H04L 9/3239 |
| 2017/0300877 | A1* | 10/2017 | Mann | G06Q 20/3672 |

OTHER PUBLICATIONS

Satoshi Nakamoto, Bitcoin: A Peer-to-Peer Electronic Cash System (May 2009), available at https://bitcoin.org/bitcoin.pdf (Year: 2009).*

Search Query Report from IP.com (dated Dec. 2, 2022) (Year: 2022).*

* cited by examiner

SYSTEM AND METHODS FOR TAMPER PROOF INTERACTION RECORDING AND TIMESTAMPING

CROSS-REFERENCE TO RELATED APPLICATIONS

| Application No. | Date Filed | Title |
|---|---|---|
| Current application | Herewith | SYSTEM AND METHODS FOR TAMPER PROOF INTERACTION RECORDING AND TIMESTAMPING Is a continuation of: |
| 17/133,243 | Dec. 23, 2020 | SYSTEM AND METHODS FOR TAMPER PROOF INTERACTION RECORDING AND TIMESTAMPING which is a continuation of: |
| 16/425,692 | May 29, 2019 | SYSTEM AND METHODS FOR TAMPER PROOF INTERACTION RECORDING AND TIMESTAMPING which is a continuation of: |
| 16/351,023 | Mar. 12, 2019 | SYSTEM AND METHODS FOR TAMPER PROOF INTERACTION RECORDING AND TIMESTAMPING which is a continuation of: |
| 15/839,159 Patent No. 10,229,275 | Dec. 12, 2017 Issue Date: Mar. 12, 2019 | SYSTEM AND METHODS FOR TAMPER PROOF INTERACTION RECORDING AND TIMESTAMPING which is a continuation of: |
| 15/414,581 Patent No. 9,842,216 | Jan. 24, 2017 Issue Date: Dec. 12, 2017 | SYSTEM AND METHODS FOR TAMPER PROOF INTERACTION RECORDING AND TIMESTAMPING which is a continuation of: |
| 14/970,713 Patent No. 9,553,982 | Dec. 16, 2015 Issue date: Jan. 24, 2017 | SYSTEM AND METHODS FOR TAMPER PROOF INTERACTION RECORDING AND TIMESTAMPING which is a continuation-in-part of: |
| 14/170,468 | Jan. 31, 2014 | SYSTEM AND METHODS FOR TAMPER PROOF INTERACTION RECORDING AND TIMESTAMPING which is a continuation of: |
| 13/936,146 | Jul. 6, 2013 | SYSTEM AND METHODS FOR SECURE DATA RECORDING AND TIMESTAMPING | the entire specification of each of which is incorporated herein by reference.

BACKGROUND OF THE INVENTION

Field of the Invention

The invention relates to the field of information security, and more particularly to the field of securely recording, storing, and timestamping data files.

Discussion of the State of the Art

In the art of information security, it is often desirable to ensure the protection of sensitive information for a variety of purposes, such as companies protecting internal proprietary information, or customer data such as account numbers, identification information, or any of a wide variety of potentially sensitive material that malicious third parties may desire to tamper with. It will be appreciated by one having ordinary skill in the art that there is an ongoing and constantly evolving struggle between security providers and such malicious entities, effectively an electronic arms race in which each side continually strives to develop new means to achieve their goals and circumvent the other's countermeasures.

One particular sensitive area of information security, is that of file authentication. Particularly, while a large focus is put on protecting information in the sense of preventing unauthorized access (i.e., preventing unwanted individuals or entities from gaining access to files such as to erase or steal information), an additional area of concern remains regarding protecting individual data files from being tampered with or falsified. Tampering with a file, such as making minor alterations to content data or properties, or falsifying entire files such as substituting a new file with similar properties in an attempt to covertly manipulate data, is a key area of information security concern. For example, contact centers employed by a large number of corporate entities often record verbal interactions with customers (one familiar with the art will be reminded of the well-known disclaimer when calling a contact center, explaining that any calls may be recorded or monitored). While it is important to protect such files from a corporation's perspective against information theft, it may also be desirable for a user to ensure that their information remains secure—sometimes, even from the contact center or other entity creating a recording. By way of hypothetical example, should a dissatisfied customer call a contact center and the call be recorded, this customer may wish to use the call recording as evidence if legal action is taken against the contact center operator or any other entity to which the conversation that was recorded might be relevant. It then becomes critical to ensure that the recording of that call has not been tampered with or altered, and furthermore that the recording itself has not been falsified, erased, obfuscated, or otherwise manipulated in any way.

A further example would be a conversation between two corporate executives, that may be recorded as a means of evidence of their interaction (such as, for example, when discussing collaborative business plans that need to be kept on record). It may then become desirable for both parties involved to ensure the authenticity of the recording and its contents, such as any numbers discussed or legal arrangements made as a verbal contract may still be binding provided the veracity of the claim can be certified.

What is needed, then, is a means to certify and verify any particular file to ensure its authenticity, as well as protect such a file against any tampering, unauthorized access or duplication, and also to provide timestamp information for such a file so that a record exists not only of the content of the file, but the exact times at which a file was created, altered, or any other relevant operation was performed. Furthermore, any such security measures must be effective in securing a file against any potentially interested party, including those that might be responsible for the security of the file itself (as with the above example, a call recording between a customer and a contact center must be protected against tampering by the contact center or any affiliates, to ensure security is maintained for the customer).

SUMMARY OF THE INVENTION

Accordingly, the inventor has conceived and reduced to practice, a system and method for securely recording voice communications, comprising a network-connected computer server and an authentication system which verifies the validity of voice communications.

According to a preferred embodiment, a system for securely recording voice communications is disclosed, comprising: a network-connected computer server comprising a memory, a processor, and a first plurality of programming instructions stored in the memory which, when executed by the processor, causes the network-connected computer server to: receive an interaction via a network, the interaction comprising a plurality of conversations each comprising one or more of the following media types: audio, video, email, and short message service (SMS); generate a recording of the interaction; receive a timestamp and hash of the recording as part of an authentication process of the recording; encrypt the recorded interaction with the timestamp embedded therein using the received hash; and store the encrypted interaction recording in a secure database.

According to another preferred embodiment, a method for securely recording voice communications is disclosed, the method comprising the steps of: receiving, at a network-connected computer server comprising a memory, a processor, and a first plurality of programming instructions, an interaction via a network, the interaction comprising a plurality of conversations each comprising one or more of the following media types: audio, video, email, and short message service (SMS); generating, by the network-connected computer server, a recording of the interaction; receiving a timestamp and hash of the recording as part of an authentication process of the recording; encrypting the recorded interaction with the timestamp embedded therein using the received hash; and storing the encrypted interaction recording in a secure database.

According to an aspect of an embodiment, the authentication process is performed by an authentication system comprising a second plurality of programming instructions stored in the memory which, when executed by the processor, causes the network-connected computer server to: receive the recording; generate the timestamp; and generate the hash of the recording.

According to an aspect of an embodiment, the authentication system is further configured to verify that the timestamp has not been tampered with.

According to an aspect of an embodiment, the authentication system is further configured to: publish the timestamp as a zero-value block chain transaction for the recording using a distributed block chain network; and verify that the timestamp has not been tampered with by validating the zero-value block chain transaction for the recording.

BRIEF DESCRIPTION OF THE DRAWING FIGURES

The accompanying drawings illustrate several embodiments of the invention and, together with the description, serve to explain the principles of the invention according to the embodiments. One skilled in the art will recognize that the particular embodiments illustrated in the drawings are merely exemplary, and are not intended to limit the scope of the present invention.

DETAILED DESCRIPTION

Figure 1:
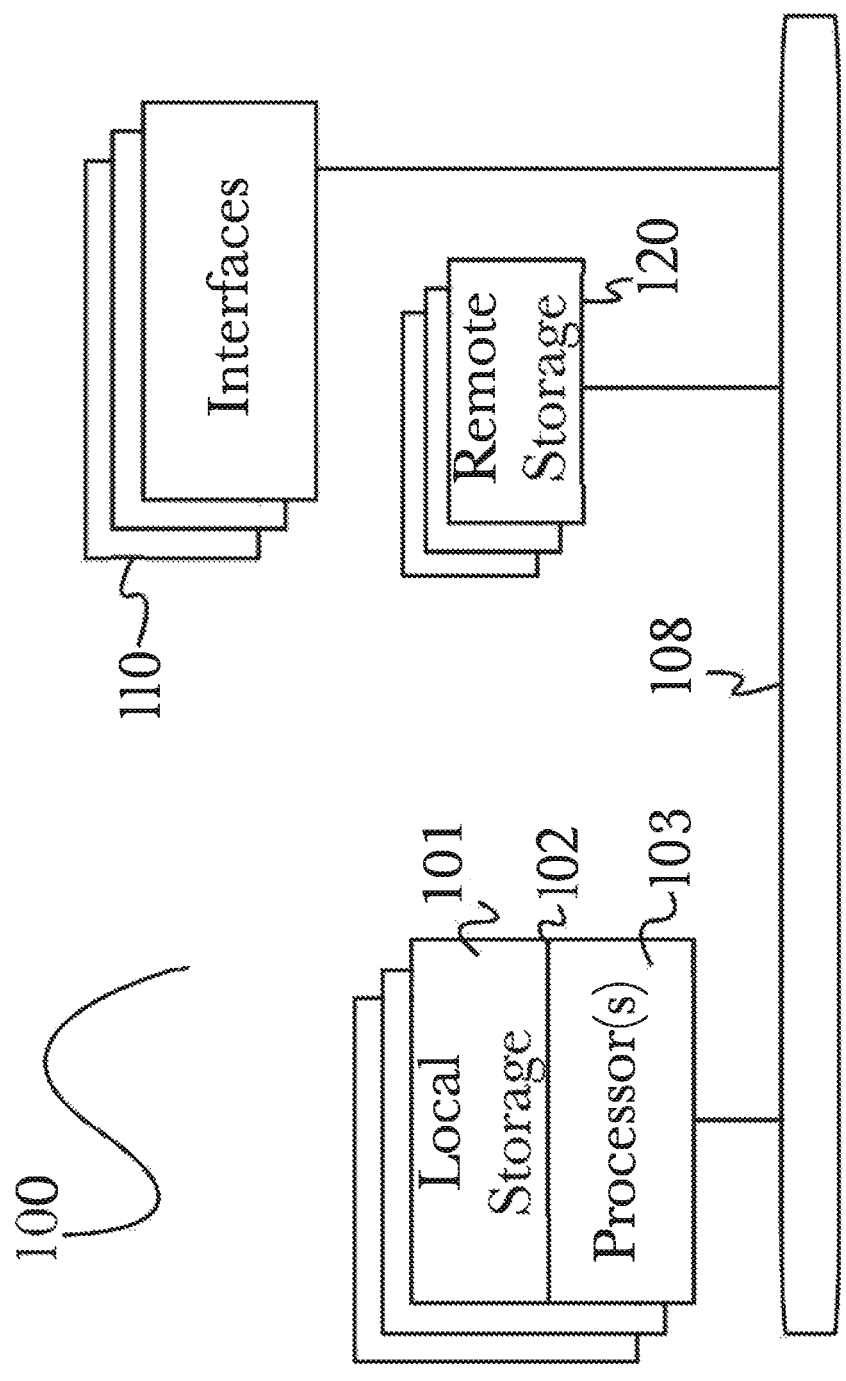
FIG. 1 is a block diagram illustrating an exemplary hardware architecture of a computing device used in an embodiment of the invention.

The inventor has conceived, and reduced to practice, a system and methods for providing secure recording, storage, and hashing of data files.

One or more different inventions may be described in the present application. Further, for one or more of the inventions described herein, numerous alternative embodiments may be described; it should be understood that these are presented for illustrative purposes only. The described embodiments are not intended to be limiting in any sense. One or more of the inventions may be widely applicable to numerous embodiments, as is readily apparent from the disclosure. In general, embodiments are described in sufficient detail to enable those skilled in the art to practice one or more of the inventions, and it is to be understood that other embodiments may be utilized and that structural, logical, software, electrical and other changes may be made without departing from the scope of the particular inventions. Accordingly, those skilled in the art will recognize that one or more of the inventions may be practiced with various modifications and alterations. Particular features of one or more of the inventions may be described with reference to one or more particular embodiments or figures that form a part of the present disclosure, and in which are shown, by way of illustration, specific embodiments of one or more of the inventions. It should be understood, however, that such features are not limited to usage in the one or more particular embodiments or figures with reference to which they are described. The present disclosure is neither a literal description of all embodiments of one or more of the inventions nor a listing of features of one or more of the inventions that must be present in all embodiments.

Headings of sections provided in this patent application and the title of this patent application are for convenience only, and are not to be taken as limiting the disclosure in any way.

Devices that are in communication with each other need not be in continuous communication with each other, unless expressly specified otherwise. In addition, devices that are in communication with each other may communicate directly or indirectly through one or more intermediaries, logical or physical.

A description of an embodiment with several components in communication with each other does not imply that all such components are required. To the contrary, a variety of optional components may be described to illustrate a wide variety of possible embodiments of one or more of the inventions and in order to more fully illustrate one or more aspects of the inventions. Similarly, although process steps, method steps, algorithms or the like may be described in a sequential order, such processes, methods and algorithms may generally be configured to work in alternate orders, unless specifically stated to the contrary. In other words, any sequence or order of steps that may be described in this patent application does not, in and of itself, indicate a requirement that the steps be performed in that order. The steps of described processes may be performed in any order practical. Further, some steps may be performed simultaneously despite being described or implied as occurring non-simultaneously (e.g., because one step is described after the other step). Moreover, the illustration of a process by its depiction in a drawing does not imply that the illustrated process is exclusive of other variations and modifications thereto, does not imply that the illustrated process or any of its steps are necessary to one or more of the invention(s), and does not imply that the illustrated process is preferred. Also, steps are generally described once per embodiment, but this does not mean they must occur once, or that they may only occur once each time a process, method, or algorithm is carried out or executed. Some steps may be omitted in some embodiments or some occurrences, or some steps may be executed more than once in a given embodiment or occurrence.

When a single device or article is described, it will be readily apparent that more than one device or article may be used in place of a single device or article. Similarly, where more than one device or article is described, it will be readily apparent that a single device or article may be used in place of the more than one device or article.

The functionality or the features of a device may be alternatively embodied by one or more other devices that are not explicitly described as having such functionality or features. Thus, other embodiments of one or more of the inventions need not include the device itself.

Techniques and mechanisms described or referenced herein will sometimes be described in singular form for clarity. However, it should be noted that particular embodiments include multiple iterations of a technique or multiple instantiations of a mechanism unless noted otherwise. Process descriptions or blocks in figures should be understood as representing modules, segments, or portions of code which include one or more executable instructions for implementing specific logical functions or steps in the process. Alternate implementations are included within the scope of embodiments of the present invention in which, for example, functions may be executed out of order from that shown or discussed, including substantially concurrently or in reverse order, depending on the functionality involved, as would be understood by those having ordinary skill in the art.

Hardware Architecture

Generally, the techniques disclosed herein may be implemented on hardware or a combination of software and hardware. For example, they may be implemented in an operating system kernel, in a separate user process, in a library package bound into network applications, on a specially constructed machine, on an application-specific integrated circuit (ASIC), or on a network interface card.

Software/hardware hybrid implementations of at least some of the embodiments disclosed herein may be implemented on a programmable network-resident machine (which should be understood to include intermittently connected network-aware machines) selectively activated or reconfigured by a computer program stored in memory. Such network devices may have multiple network interfaces that may be configured or designed to utilize different types of network communication protocols. A general architecture for some of these machines may be disclosed herein in order to illustrate one or more exemplary means by which a given unit of functionality may be implemented. According to specific embodiments, at least some of the features or functionalities of the various embodiments disclosed herein may be implemented on one or more general-purpose computers associated with one or more networks, such as for example an end-user computer system, a client computer, a network server or other server system, a mobile computing device (e.g., tablet computing device, mobile phone, smartphone, laptop, and the like), a consumer electronic device, a music player, or any other suitable electronic device, router, switch, or the like, or any combination thereof. In at least some embodiments, at least some of the features or functionalities of the various embodiments disclosed herein may be implemented in one or more virtualized computing environments (e.g., network computing clouds, virtual machines hosted on one or more physical computing machines, or the like).

Referring now to FIG. 1, there is shown a block diagram depicting an exemplary computing device 100 suitable for implementing at least a portion of the features or functionalities disclosed herein. Computing device 100 may be, for example, any one of the computing machines listed in the previous paragraph, or indeed any other electronic device capable of executing software- or hardware-based instructions according to one or more programs stored in memory. Computing device 100 may be adapted to communicate with a plurality of other computing devices, such as clients or servers, over communications networks such as a wide area network a metropolitan area network, a local area network, a wireless network, the Internet, or any other network, using known protocols for such communication, whether wireless or wired.

In one embodiment, computing device 100 includes one or more central processing units (CPU) 102, one or more interfaces 110, and one or more busses 106 (such as a peripheral component interconnect (PCI) bus). When acting under the control of appropriate software or firmware, CPU 102 may be responsible for implementing specific functions associated with the functions of a specifically configured computing device or machine. For example, in at least one embodiment, a computing device 100 may be configured or designed to function as a server system utilizing CPU 102, local memory 101 and/or remote memory 120, and interface(s) 110. In at least one embodiment, CPU 102 may be caused to perform one or more of the different types of functions and/or operations under the control of software modules or components, which for example, may include an operating system and any appropriate applications software, drivers, and the like.

CPU 102 may include one or more processors 103 such as, for example, a processor from one of the Intel, ARM, Qualcomm, and AMD families of microprocessors. In some embodiments, processors 103 may include specially designed hardware such as application-specific integrated circuits (ASICs), electrically erasable programmable read-only memories (EEPROMs), field-programmable gate arrays (FPGAs), and so forth, for controlling operations of computing device 100. In a specific embodiment, a local memory 101 (such as non-volatile random access memory (RAM) and/or read-only memory (ROM), including for example one or more levels of cached memory) may also form part of CPU 102. However, there are many different ways in which memory may be coupled to system 100. Memory 101 may be used for a variety of purposes such as, for example, caching and/or storing data, programming instructions, and the like.

As used herein, the term "processor" is not limited merely to those integrated circuits referred to in the art as a processor, a mobile processor, or a microprocessor, but broadly refers to a microcontroller, a microcomputer, a programmable logic controller, an application-specific integrated circuit, and any other programmable circuit.

In one embodiment, interfaces 110 are provided as network interface cards (NICs). Generally, NICs control the sending and receiving of data packets over a computer network; other types of interfaces 110 may for example support other peripherals used with computing device 100. Among the interfaces that may be provided are Ethernet interfaces, frame relay interfaces, cable interfaces, DSL interfaces, token ring interfaces, graphics interfaces, and the like. In addition, various types of interfaces may be provided such as, for example, universal serial bus (USB), Serial, Ethernet, Firewire™, PCI, parallel, radio frequency (RF), Bluetooth™, near-field communications (e.g., using near-field magnetics), 802.11 (WiFi), frame relay, TCP/IP, ISDN, fast Ethernet interfaces, Gigabit Ethernet interfaces, asynchronous transfer mode (ATM) interfaces, high-speed serial interface (HSSI) interfaces, Point of Sale (POS) interfaces, fiber data distributed interfaces (FDDIs), and the like. Generally, such interfaces 110 may include ports appropriate for communication with appropriate media. In some cases, they may also include an independent processor and, in some instances, volatile and/or non-volatile memory (e.g., RAM).

Although the system shown in FIG. 1 illustrates one specific architecture for a computing device 100 for implementing one or more of the inventions described herein, it is by no means the only device architecture on which at least a portion of the features and techniques described herein may be implemented. For example, architectures having one or any number of processors 103 may be used, and such processors 103 may be present in a single device or distributed among any number of devices. In one embodiment, a single processor 103 handles communications as well as routing computations, while in other embodiments a separate dedicated communications processor may be provided. In various embodiments, different types of features or functionalities may be implemented in a system according to the invention that includes a client device (such as a tablet device or smartphone running client software) and server systems (such as a server system described in more detail below).

Regardless of network device configuration, the system of the present invention may employ one or more memories or memory modules (such as, for example, remote memory block 120 and local memory 101) configured to store data, program instructions for the general-purpose network operations, or other information relating to the functionality of the embodiments described herein (or any combinations of the above). Program instructions may control execution of or comprise an operating system and/or one or more applications, for example. Memory 120 or memories 101, 120 may also be configured to store data structures, configuration data, encryption data, historical system operations information, or any other specific or generic non-program information described herein.

Because such information and program instructions may be employed to implement one or more systems or methods described herein, at least some network device embodiments may include nontransitory machine-readable storage media, which, for example, may be configured or designed to store program instructions, state information, and the like for performing various operations described herein. Examples of such nontransitory machine-readable storage media include, but are not limited to, magnetic media such as hard disks, floppy disks, and magnetic tape; optical media such as CD-ROM disks; magneto-optical media such as optical disks, and hardware devices that are specially configured to store and perform program instructions, such as read-only memory devices (ROM), flash memory, solid state drives, memristor memory, random access memory (RAM), and the like. Examples of program instructions include both object code, such as may be produced by a compiler, machine code, such as may be produced by an assembler or a linker, byte code, such as may be generated by for example a Java™ compiler and may be executed using a Java virtual machine or equivalent, or files containing higher level code that may be executed by the computer using an interpreter (for example, scripts written in Python, Perl, Ruby, Groovy, or any other scripting language).

Figure 2:
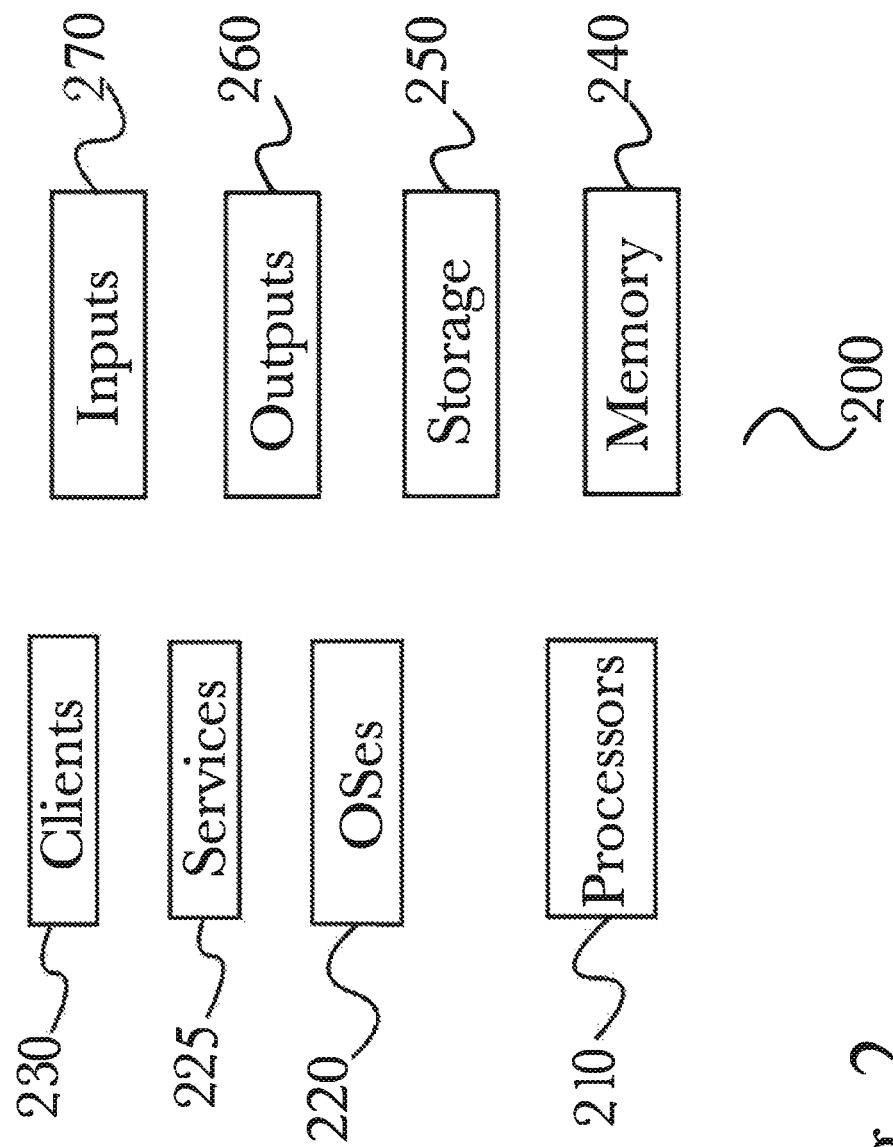
FIG. 2 is a block diagram illustrating an exemplary logical architecture for a client device, according to an embodiment of the invention.

In some embodiments, systems according to the present invention may be implemented on a standalone computing system. Referring now to FIG. 2, there is shown a block diagram depicting a typical exemplary architecture of one or more embodiments or components thereof on a standalone computing system. Computing device 200 includes processors 210 that may run software that carry out one or more functions or applications of embodiments of the invention, such as for example a client application 230. Processors 210 may carry out computing instructions under control of an operating system 220 such as, for example, a version of Microsoft's Windows™ operating system, Apple's Mac OS/X or iOS operating systems, some variety of the Linux operating system, Google's Android™ operating system, or the like. In many cases, one or more shared services 225 may be operable in system 200, and may be useful for providing common services to client applications 230. Services 225 may for example be Windows™ services, user-space common services in a Linux environment, or any other type of common service architecture used with operating system 210. Input devices 270 may be of any type suitable for receiving user input, including for example a keyboard, touchscreen, microphone (for example, for voice input), mouse, touchpad, trackball, or any combination thereof. Output devices 260 may be of any type suitable for providing output to one or more users, whether remote or local to system 200, and may include for example one or more screens for visual output, speakers, printers, or any combination thereof. Memory 240 may be random-access memory having any structure and architecture known in the art, for use by processors 210, for example to run software. Storage devices 250 may be any magnetic, optical, mechanical, memristor, or electrical storage device for storage of data in digital form. Examples of storage devices 250 include flash memory, magnetic hard drive, CD-ROM, and/or the like.

Figure 3:
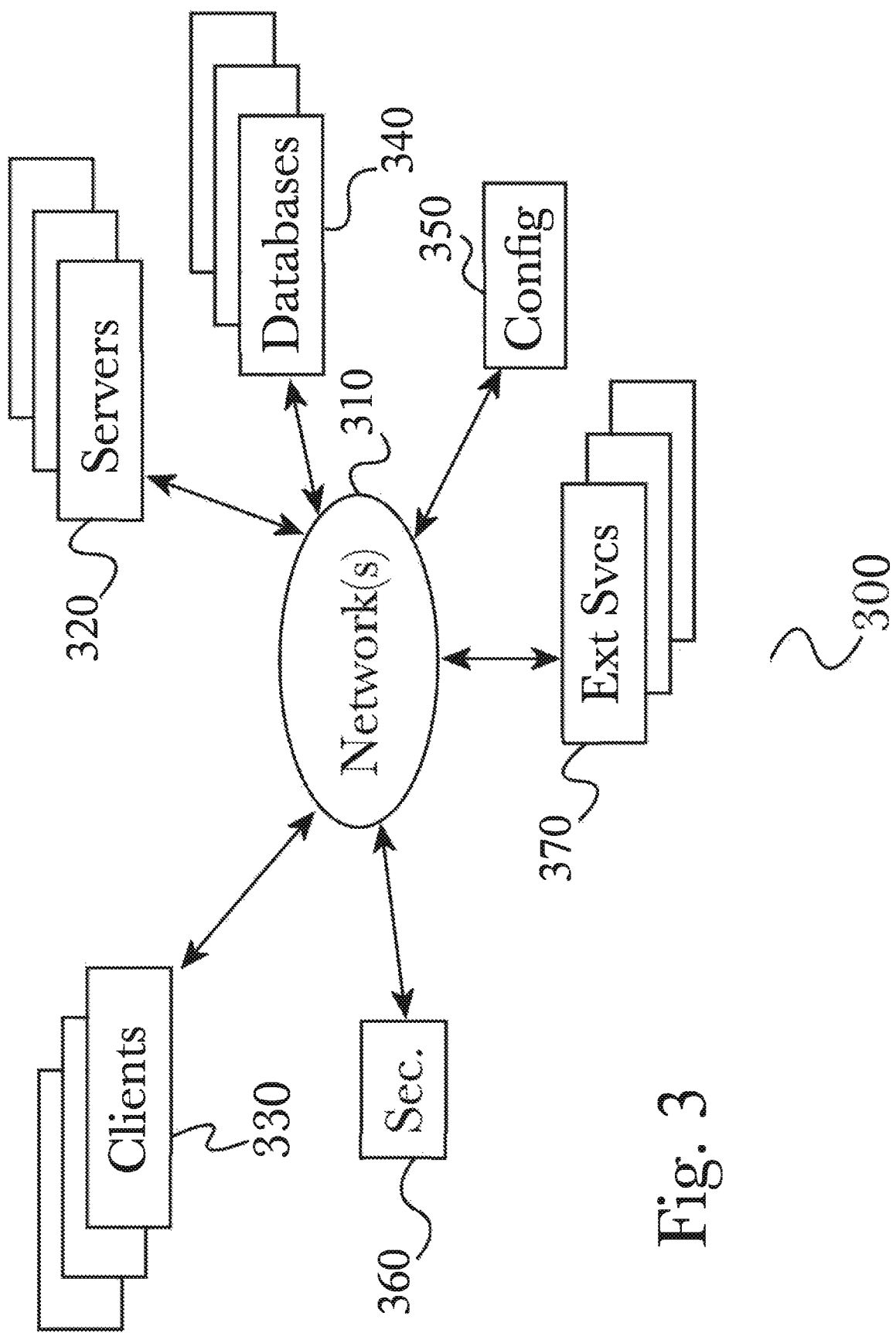
FIG. 3 is a block diagram showing an exemplary architectural arrangement of clients, servers, and external services, according to an embodiment of the invention.

In some embodiments, systems of the present invention may be implemented on a distributed computing network, such as one having any number of clients and/or servers. Referring now to FIG. 3, there is shown a block diagram depicting an exemplary architecture for implementing at least a portion of a system according to an embodiment of the invention on a distributed computing network. According to the embodiment, any number of clients 330 may be provided. Each client 330 may run software for implementing client-side portions of the present invention; clients may comprise a system 200 such as that illustrated in FIG. 2. In addition, any number of servers 320 may be provided for handling requests received from one or more clients 330. Clients 330 and servers 320 may communicate with one another via one or more electronic networks 310, which may be in various embodiments any of the Internet, a wide area network, a mobile telephony network, a wireless network (such as WiFi, Wimax, and so forth), or a local area network (or indeed any network topology known in the art; the invention does not prefer any one network topology over any other). Networks 310 may be implemented using any known network protocols, including for example wired and/or wireless protocols.

In addition, in some embodiments, servers 320 may call external services 370 when needed to obtain additional information, or to refer to additional data concerning a particular call. Communications with external services 370 may take place, for example, via one or more networks 310. In various embodiments, external services 370 may comprise web-enabled services or functionality related to or installed on the hardware device itself. For example, in an embodiment where client applications 230 are implemented on a smartphone or other electronic device, client applications 230 may obtain information stored in a server system 320 in the cloud or on an external service 370 deployed on one or more of a particular enterprise's or user's premises.

In some embodiments of the invention, clients 330 or servers 320 (or both) may make use of one or more specialized services or appliances that may be deployed locally or remotely across one or more networks 310. For example, one or more databases 340 may be used or referred to by one or more embodiments of the invention. It should be understood by one having ordinary skill in the art that databases 340 may be arranged in a wide variety of architectures and using a wide variety of data access and manipulation means. For example, in various embodiments one or more databases 340 may comprise a relational database system using a structured query language (SQL), while others may comprise an alternative data storage technology such as those referred to in the art as "NoSQL" (for example, Hadoop Cassandra, Google BigTable, and so forth). In some embodiments, variant database architectures such as column-oriented databases, in-memory databases, clustered databases, distributed databases, or even flat file data repositories may be used according to the invention. It will be appreciated by one having ordinary skill in the art that any combination of known or future database technologies may be used as appropriate, unless a specific database technology or a specific arrangement of components is specified for a particular embodiment herein. Moreover, it should be appreciated that the term "database" as used herein may refer to a physical database machine, a cluster of machines acting as a single database system, or a logical database within an overall database management system. Unless a specific meaning is specified for a given use of the term "database", it should be construed to mean any of these senses of the word, all of which are understood as a plain meaning of the term "database" by those having ordinary skill in the art.

Similarly, most embodiments of the invention may make use of one or more security systems 360 and configuration systems 350. Security and configuration management are common information technology (IT) and web functions, and some amount of each are generally associated with any IT or web systems. It should be understood by one having ordinary skill in the art that any configuration or security subsystems known in the art now or in the future may be used in conjunction with embodiments of the invention without limitation, unless a specific security 360 or configuration system 350 or approach is specifically required by the description of any specific embodiment.

In various embodiments, functionality for implementing systems or methods of the present invention may be distributed among any number of client and/or server components. For example, various software modules may be implemented for performing various functions in connection with the present invention, and such modules may be variously implemented to run on server and/or client components.

Conceptual Architecture

Figure 4:
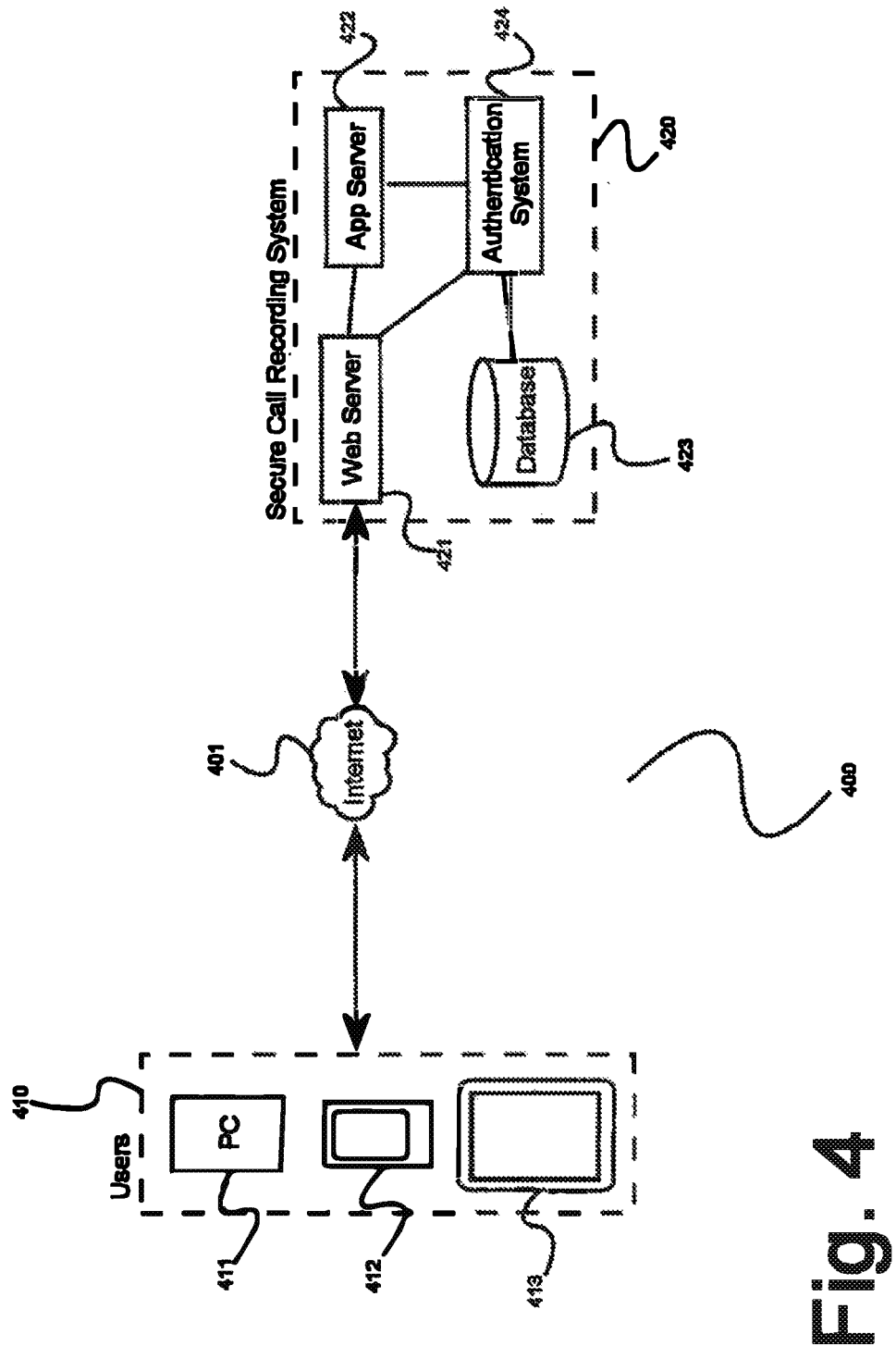
FIG. 4 is a block diagram of an exemplary system architecture for providing secure call recording and storage, according to a preferred embodiment of the invention.

FIG. 4 is a block diagram illustrating an exemplary system 400 for providing secure recording and storage of data such as audio calls. As illustrated, various traditional components of a computing network may be interconnected and in communication via the Internet 401 or a similar data communications network. It should be appreciated by one having ordinary skill in the art, that such an arrangement is exemplary and a variety of connection and communication means exist which may be utilized according to the invention, and it should be further appreciated that various combinations of connections and communication means may be utilized.

As illustrated, a plurality of users 410 may interact with a secure call recording system 420 via a variety of hardware or software means common in the art, several examples of which are illustrated. It should be appreciated that such means as illustrated and described below are exemplary, and any of a variety of additional or alternate means may be utilized according to the invention. Hardware means may include (but are not limited to) electronic devices capable of communication over a communications network 401, such as a personal computer 411 (such as a laptop or desktop computer), mobile smartphone 412, or a tablet computing device 413. As appropriate and according to the specific nature of a device being utilized, users 410 may interact using a variety of software means (not illustrated), such as a web browser accessing a webpage or other internet-enabled software (as may be appropriate when using a personal computer 411), or a mobile application (as may be appropriate when using a mobile smartphone 412 or tablet computing device 413). It should be appreciated that, as with physical devices described above, such means as described are exemplary and a variety of additional or alternate means may be utilized according to the invention.

As further illustrated, users 410 may communicate across a communications network 401 or similar communication connection, for such purposes as interaction with a secure call recording system 420, various components of which may be similarly connected to a network 401 for communication, and which may also be interconnected within system 420 for communication with other components. Such components may include (but are not limited to) a web server 421 that may operate web-accessible content such as webpages or interfaces for viewing by users and also may receive web interactions from users, an application server 422 that may operate various software elements for interaction such as via web-enabled means operated by web server 421, a database 423 or similar data storage component that may store data from other components as well as provide such stored data for interaction (such as for viewing or modifying existing data), and an authentication system 424 that may operate authentication software or perform authentication procedures to ensure security of call recordings.

As illustrated, authentication system 424 may be connected and in communication with other components such as app server 422 such as to provide functionality for interaction via software elements (as may be appropriate for enabling users to verify the security or authenticity of a particular call recording), web server 421 such as to provide functionality for interaction via webpages or similar web-enabled means, and database 423 such as to store and retrieve information relevant to call recordings such as (for example) key-based security information, timestamp data, or other information that might be relevant to call recordings or the authentication thereof. In this manner it can be appreciated that a function of authentication system 424 may be to provide functionality to other components that may operate specific means of interaction, while still optionally providing functionality directly to user applications or devices 410, thereby enabling a variety of arrangements and means of interaction according to the invention.

It should be appreciated that the nature of a call recording system 420 as illustrated is flexible, in that it may be readily adapted to any of a number of security models as are common in the art and as may become available as the art continues to evolve. IT should be further appreciated that security is an area of great interest, and new mechanisms or procedures may become available and may utilized according to the invention.

Figure 5:
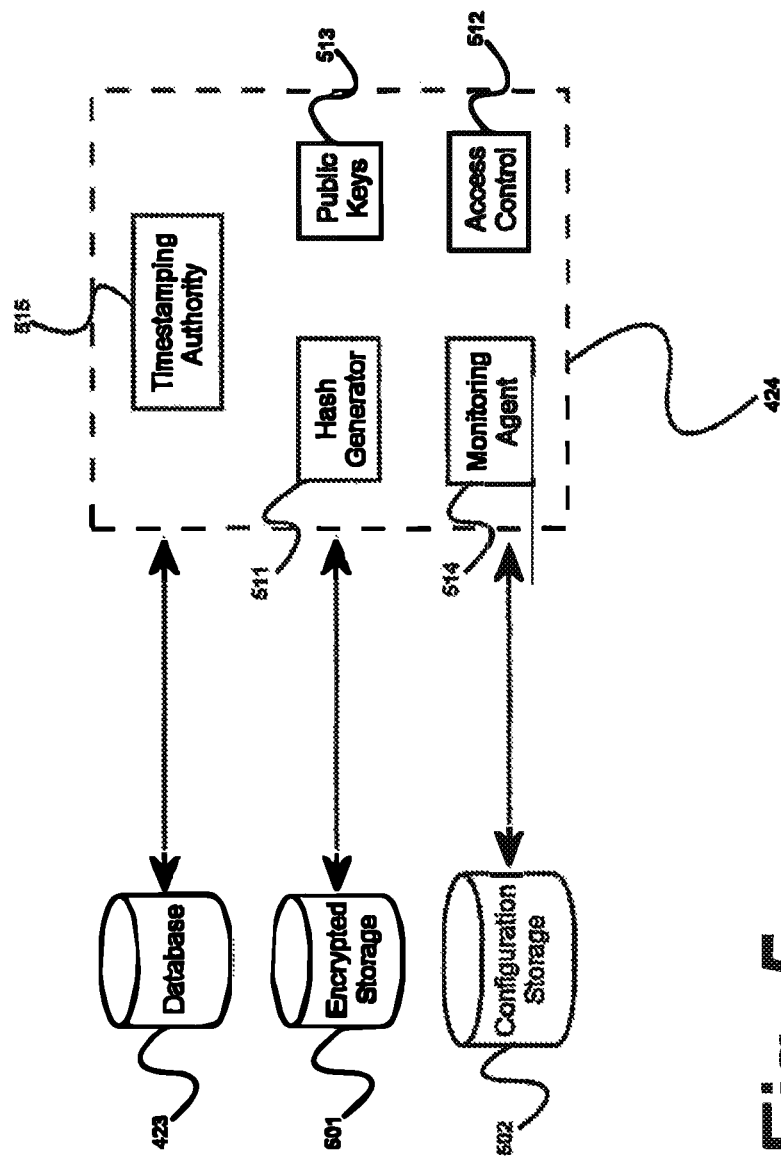
FIG. 5 is a block diagram of an exemplary authentication system, illustrating various means of security according to an embodiment of the invention.

FIG. 5 is a block diagram illustrating an exemplary authentication system 424 in greater detail, according to an embodiment of the invention. As illustrated, authentication system 424 may be in communication with a database 423 or similar data storage as described previously (referring to FIG. 4), and may also optionally be connected to or in communication with an encrypted file storage 501, which may itself be a component of a database 423 or a separate, distinct element as appropriate (such as, for example, maintaining an offsite encrypted storage to ensure physical as well as electronic security). It should be appreciated that due to the nature of data storage in the art, it is possible that encrypted data storage 501 may be located or operated in a variety of ways, such as in a dedicated physical storage (such as magnetic or optical storage media as are common in the art), software-based database systems as are common in the art, or remote or cloud-based data storage technologies such as Amazon S3™ as are common in the art. In this manner, encrypted data may be kept physically separate from other elements of system 400 or authentication system 424, facilitating a layer of physical security in addition to various means of electronic security being illustrated and described.

As further illustrated, authentication system 424 may comprise a variety of security elements according to various security models that may be implemented, and which may be implemented alongside or in conjunction with one another for cooperative functioning or which may be operated distinctly, either as elements of a single authentication system (as illustrated) or as separate authentication systems or subsystems operating jointly or independently, as may be appropriate for various particular implementations of the system of the invention.

As illustrated, authentication system 424 may comprise a hash generator 511 that may operate hashing algorithms as are common in the art such as for obfuscating recorded data. Hash generator 511 may utilize any of a number of methods of obfuscation, such as MD5 and SHA-1 hashing algorithms as are commonly utilized in the art of information security. Use of such hashing may be utilized to provide a means for convenient authenticity verification (verify whether a hash matches, if not then a file may have been altered), or as a means of reference (displaying file hashes rather than contents, such that information may be hidden from view until a user is authenticated for a particular file), or a variety of additional or alternative uses that may be desired and may be utilized according to the invention. Additionally, hashing engine 511 may "sign" a file upon creation prior to or following hashing the file, such as to confirm the authenticity of the recording or hashing party. For example, if a file is recorded it may be signed with a security signature (such as by appending a key-based signature to the end of the file's content data, as is common in the art for ensuring a file came from a trusted source), or a file may be signed after hashing such as to effectively authenticate the hash result as coming from a trusted source, or combinations of signatures such as to authenticate both the file's contents as well as the hashing operation itself. It should be appreciated that signing a file is a trivial yet important operation, and performing multiple security signatures on a single file may increase the level of security or trust without altering or obfuscating a file's contents. It should be further appreciated that as with many aspects of information security, hashing and signing methods may change and new or alternate means may be utilized according to the invention.

An exemplary signature method according to the embodiment may involve the use of a public block chain, a form of distributed database that maintains a list of all transactions to date on each node in the database (for example, as used in the bitcoin cryptocurrency system). In a block chain, "blocks" or sets of completed transactions (such as transferring cryptocurrency funds from one account to another, as with bitcoin) are periodically updated. During an update, a block is pushed from one node (generally, an originating node where a transaction completed, for example a user's computer used to receive or send funds) to other nodes rapidly, enabling every node in the system to maintain an up-to-date record of all transactions. Through the use of distributed nodes, data integrity is maintained through general consensus, protecting the block chain against tampering or errors such as might arise if nodes lose connectivity or are run autonomously and produce errors during unattended operation. This "general consensus" method also enables any one node to verify a transaction with other copies of the block chain, preventing counterfeiting or tampering.

Using a block chain arrangement, signatures for recordings may be published to a block chain either using a block chain specifically configured for such use (for example, where each "transaction" is a single recording's unique signature), or by "piggybacking" on an existing block chain by conducting zero-sum transactions and attaching signature data to them (for example, by using a signature as a destination wallet for a fund transfer, so it is irrevocably stored in the block chain). In this manner, signatures may be published in a manner that is publicly accessible, easily verified and validated, and resistant to tampering or forgery.

As further illustrated, authentication system 424 may further comprise a key-based authentication model, such as by storing users' public keys 512 for encrypting data. In a key-based security model, a private and public key pairing may be created such as by a trusted third-party key issuer or by a user on a trusted device under their control such as a personal computer. A public key 512 may be stored for use in encrypting data for that user, and only the corresponding private key (not shown) may be used to decrypt the data. According to such a model, encryption is accomplished via a one-way algorithm, and such methods of information security are common in the art and variations are possible such as using novel encryption algorithms. In this manner, an authentication system 424 may be responsible for encrypting data on behalf of a user, but only that user (with their respective private key) may access the encrypted data. In such an encryption model, the presence of a public key is not sufficient to invalidate security of data and the private key is necessary for any useful information to be obtained, ensuring data privacy and access control for users.

As further illustrated, an authentication system 424 may further comprise an access control element 513 such as user authentication or authorization by any of a variety of means common in the art, such as (for example) username/password login or similar credentials-based access, key-based user authorization such as public/private key pairs as described above, physical access controls such as via smartcards or RFID identification, or any other of a wide variety of user authorization as is common in the art. It should be noted that authorization differs fundamentally from authentication, in that authentication may be utilized to verify that a user is who they claim to be (i.e., verifying that an unauthorized user isn't attempting gain access to data), whereas authorization may be used to determine what a user (once authenticated) may be granted access privileges to (i.e., now that a user is verified to be who they claim, what data are they permitted to access/modify?). An authentication system 424 may thus also serve in this manner as an authorization manager, performing related security tasks as described to both authenticate and authorize access to other components of a system 400 such as stored data or configuration settings (such as allowing an authenticated user to upload a new public key 513 for use in encrypting their data). In this manner, security may be maintained both on a per-file basis (hashing, encryption) as well as a per-user basis (users may be authorized only for select data, and may be verified prior to being given any access privileges), facilitating not only protection of data from external theft but also protecting a user's information from being shared with others and thus answering any privacy concerns that may arise with a shared data storage system.

As further illustrated, authentication system 424 may further comprise a monitoring agent 514 that may be connected to or in communication with other elements of a system 400, such as any connected data storage 423. Monitoring agent 514 may be utilized for such purposes as logging or reporting on the status or activity of any configured elements (i.e., those selected to be enabled for monitoring), such as to enable monitoring of stored file information. In this manner, in addition to securely storing and providing access to file data, the files themselves may be monitored for interaction such as (for example) instances of user access or alteration, such as when a user may read a file or produce a copy of the file or any of its contents. In this manner, security concerns regarding data theft (and not necessarily alteration) may be addressed by monitoring any activity on a file such as read or copy operations that may leave the file itself unaltered and therefore may be difficult to detect using other methods. According to such a security model, files stored may be protected against unauthorized access, alteration, substitution, duplication, or any form of interaction that may be undesirable for sensitive data.

As further illustrated, authentication system 424 may further comprise a timestamping authority 515, that may facilitate timestamping of files, i.e. recording date and time information such as when a file was created or modified. Such timestamping may be desirable for such purposes as to verify that a file has not been replaced at a later date or in conjunction with a monitoring agent 514 described previously such as to provide an exact date or time of an access or modification to a file. It should be appreciated that there are a variety of means of providing trusted timestamping (i.e., timestamping operations that are considered to be secure and reliable both to the data holder as well as to users accessing data that may be sensitive and who may desire to protect their data not only from other users but also from a data holder) in the art, several of which will be described below in greater detail (referring to FIGS. 6, 8-10), and it should be further appreciated that when it may be desirable such as to address security or trust concerns for users, a third-party timestamping authority (TSA) may be utilized according to the invention (as described in greater detail below, referring to FIG. 8). In this manner, it can be appreciated that a secure call recording system 420 may now address security concerns regarding file validity (whether a file has been replaced), integrity (whether a file has been altered), privacy (whether a file is being accessed or duplicated), user security (ensuring only authorized users may view file information), and also that detailed timestamp information may be maintained as may be relevant to each of these security concerns in some manner—for example, according to the operation described, a user may verify that the file they recorded is still authentic along with when it was recorded (which itself may further confirm authenticity, as a mismatched timestamp could indicate tampering), the user may also monitor whether a file has been accessed, modified, or duplicated, and may further identify when any such security infractions occurred. Furthermore, it should be appreciated that trusted timestamping in itself may be utilized as a security measure in addition to simple timestamping of file interactions—by verifying a file's relevant timestamps (such as when the file was created, last accessed, last modified, or any other timestamp information that may be relevant), a user can verify that the timestamp data remains consistent to confirm whether any tampering may have occurred that would trigger a timestamp change.

In a block chain-based arrangement as described previously, a timestamping authority may publish a timestamp with a transaction to a block chain, so that the timestamp is permanently recorded and inherently authenticated by each participating node in the block chain used. Such an arrangement ensures timestamps cannot be falsified or tampered with after publication.

It should be appreciated that the operation and interaction of various components as described above may be configurable, and that such configuration may be of varied implementation according to the invention such as stored configuration information 502 as illustrated, which may itself be stored and accessed in a variety of means as described below. For example, authorized users such as IT personnel may configure operation of an authentication system 424 during an initial setup or installation, or configuration may be alterable later by authorized users (which may themselves be authenticated and authorized to make configuration changes by authentication system 424). By extension, it should be appreciated that configuration information may be loaded from an external source such as an encrypted data storage 501, which could store not only encrypted file information but also basic system operation information that may be desirable to encrypt such as to prevent tampering with system operations. Configuration information might also be loaded from a third-party or remote data storage, such as cloud-based storage solutions common in the art, and need not necessarily be located or operated alongside other data storage for example, unencrypted file storage 423, encrypted file storage 501, and configuration information 502 may each be stored and accessed from separate systems as may be desirable according to particular implementations of the system of the invention or security models being utilized.

Detailed Description of Exemplary Embodiments

Figure 6:
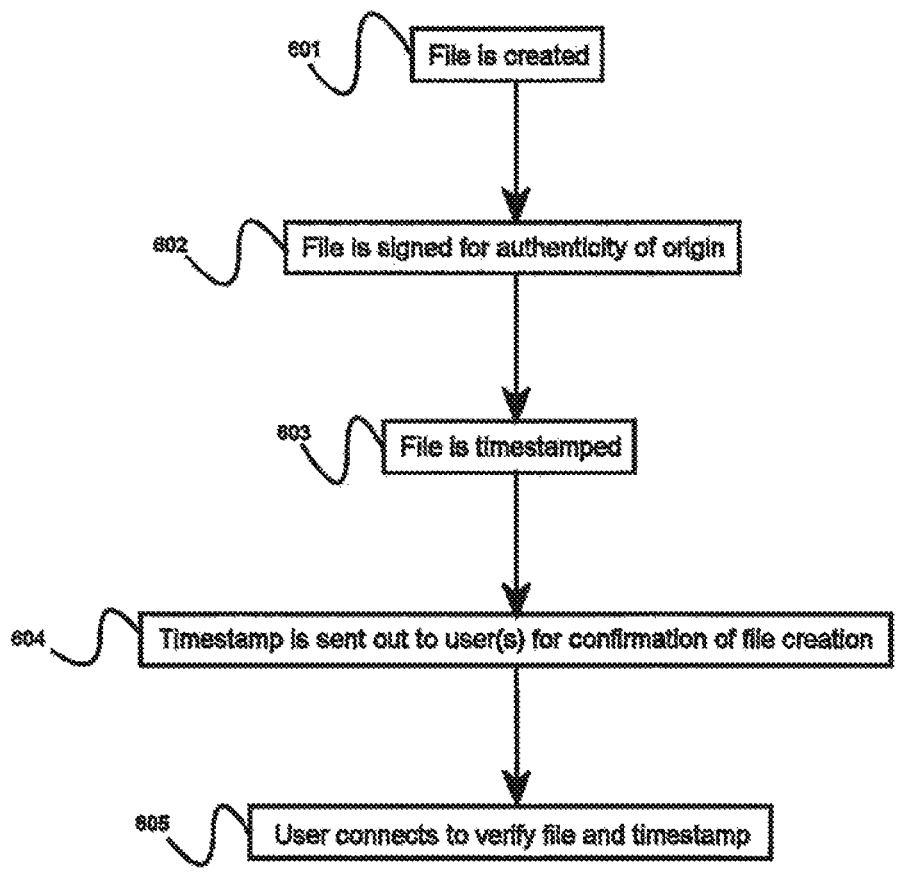
FIG. 6 is a method diagram illustrating an exemplary method for providing secure call recording and storage, according to a preferred embodiment of the invention.

FIG. 6 is a method illustration of an exemplary method 600 for providing secure interaction recording operations according to an embodiment of the invention, comprising the general operation of recording a file, signing it to confirm the authenticity of the recording party, timestamping the file's creation, and then a user confirming such authentications to verify the security of a file.

In an initial step 601, a file may be created such as (for example) when an audio conversation or call is recorded and stored, or when a chat conversation (such as any of a variety of Internet-based chat protocols and services, as are common in the art) is stored. Such storage may be on any of a variety of storage media as described previously (referring to FIG. 5), and storage methods and media may vary according to the invention. In a next step 602, a file may be signed or otherwise authenticated such as to ensure that it was created or stored by a trusted source, such as via any of a variety of signing or hashing means discussed previously (referring to FIG. 5).

In a third step 603, a file may have timestamp data attached to it (such as via file containers, appending to file contents, or any other of a variety of means of timestamping files as are common in the art), such as to identify the time of the file's creation, signing, hashing, or any other relevant operations performed upon the file for which timestamp data may be desirable or relevant. It should be appreciated that having additional timestamping data may increase the level of security or trust for any given file, without negatively impacting the file's contents—i.e., it may generally be desirable to provide more timestamp information than less, and adding further timestamps with finer granularity or for multiple events may be desirable such as to give users the security or comfort of full transparency regarding their files or data (i.e., they may be able to see everything that happens to their data, as well as when it happened, increasing user confidence).

In an optional step 604, file timestamp information may optionally be sent to users, as may be desirable for immediate confirmation of a file's status. Such received timestamps may then be utilized in any manner desirable to the user or simply discarded, but it can be appreciated by one with ordinary skill in the art that an apparent use of received timestamps might be to keep a record of file interactions that may be used at a later time to verify or authenticate data (does the timestamp on this file match the one that was sent when it was created? If not, the file may have been tampered with).

In a final step 605, a user may connect to a secure call recording system 420 as described previously (referring to FIG. 4), and may now access their data and verify any relevant or desirable information such as the file's hash data, security signatures, or timestamps. In this manner, a user may easily "check up" on their data, ensuring that all associated information and security safeguards match the expected values and thereby ensuring data security, integrity, and privacy. In this manner, it can be appreciated that the operation as described may provide a fully-closed system for file creation, storage, security, access, and finally verification of file security. Additional methods for providing security and timestamping are described below, referring to FIGS. 7-10.

Figure 7:
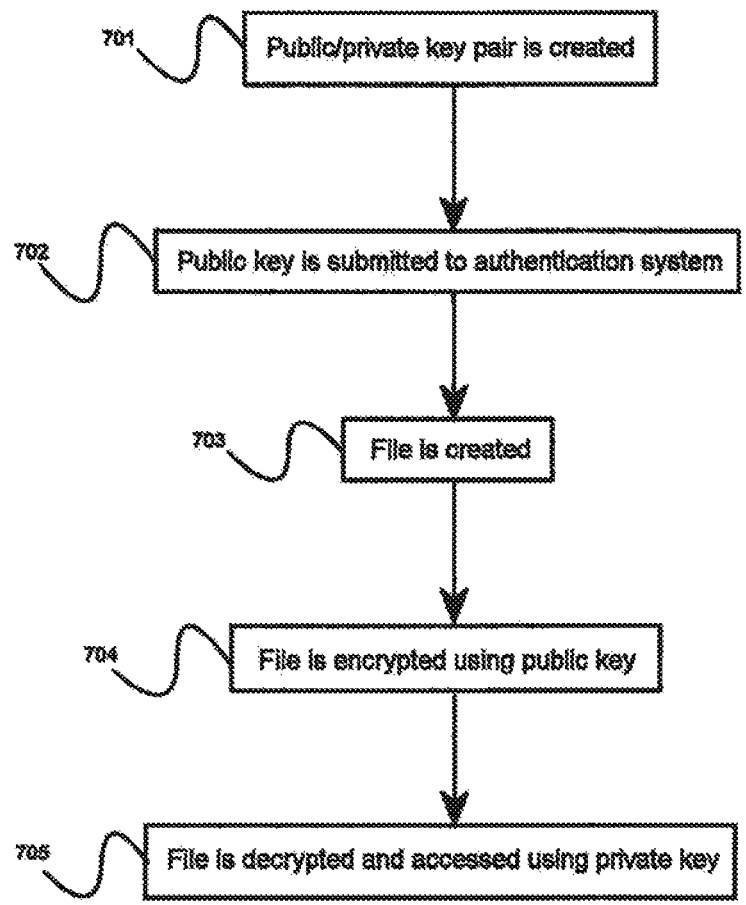
FIG. 7 is a method diagram illustrating an exemplary method for providing secure file storage and retrieval utilizing key-based authentication, according to an embodiment of the invention.

FIG. 7 is a method diagram illustrating an exemplary method 700 for providing secure file encryption using a key-based model as is common in the art, according to an embodiment of the invention. It should be appreciated that although a basic public/private key-based security model is described, the method illustrated may be readily adapted to any key-based security model readily, and alternate means of providing key-based functionality may be utilized according to the invention.

In an initial step 701, a pair of public and private keys may be created for use in key-based security. It should be appreciated that a user may already have existing public/private key pairs that they may wish to use, such as is common for individuals that may use a variety of secure software services, and it should be appreciated that the creation of key pairs as illustrated as a part of the method 700 of the invention may occur at any time and therefore pre-existing keys may be used according to the invention. It should be further appreciated that a user may not be responsible for creating their own key pairs, and they may be created for them in a secure fashion (such as IT personnel creating and distributing keys for other members within a corporation), and it should be further appreciated that any of a variety of key-generation operations may be performed according to the invention and that the key concept being illustrated is that of a user having a public and private keys that may be linked in such a manner as to be appropriate for key-based authentication, while the specific means or origin of their generation may vary according to the invention.

In a next step 702, a user may submit their public key to an authentication system 424 for use in file encryption. According to a key-based security model, this public key may be utilized for one-way encryption algorithms to be performed on file data, obfuscating the contents or properties of a file such that the raw data may pose little or no security vulnerability if exposed. A file may be created in a next step 703, such as an audio call being recorded and the resultant recording stored as appropriate according to a particular implementation of the system 400 of the invention. In a next step 704, this file may then be encrypted as described above using a one-way encryption method utilizing a public key, such that the file's data is now securely obscured and no longer a security vulnerability should it be exposed (as the data is now meaningless and indecipherable except via a matching private key). In a next step 705, a user may now access this encrypted data and may use their corresponding private key to decrypt the file's data for viewing or interaction. It should be appreciated that such decryption may be performed manually (i.e., a user may retrieve a file or a copy of a file, then manually perform decryption at their convenience such as on a personal computing device without necessarily maintaining a connection to system 400 such as for additional security precautions), or as an automated or configurable software component such as may be operated as a function of the particular means with which a user may view or interact with files (for example, a software interface that allows users to view encrypted files and automatically decrypts them using a known private key when possible, so a user may interact with their data without concerning themselves with the technicalities of the security means being operated). In this manner, a user may securely create and retrieve data without any third-party being able to view or interact with their data in any way, including any data storage service being utilized.

Such a security model may allow for secure file storage on otherwise insecure or ordinary storage media such as third-party cloud data services or removable physical storage media that might be stolen, duplicated, or otherwise tampered with. In such instances, the data of any files may still remain secure as it is only decipherable using a user's matched private key, which ideally should be kept distinct from any file storage to minimize security risk in case of theft or tampering.

Figure 8:
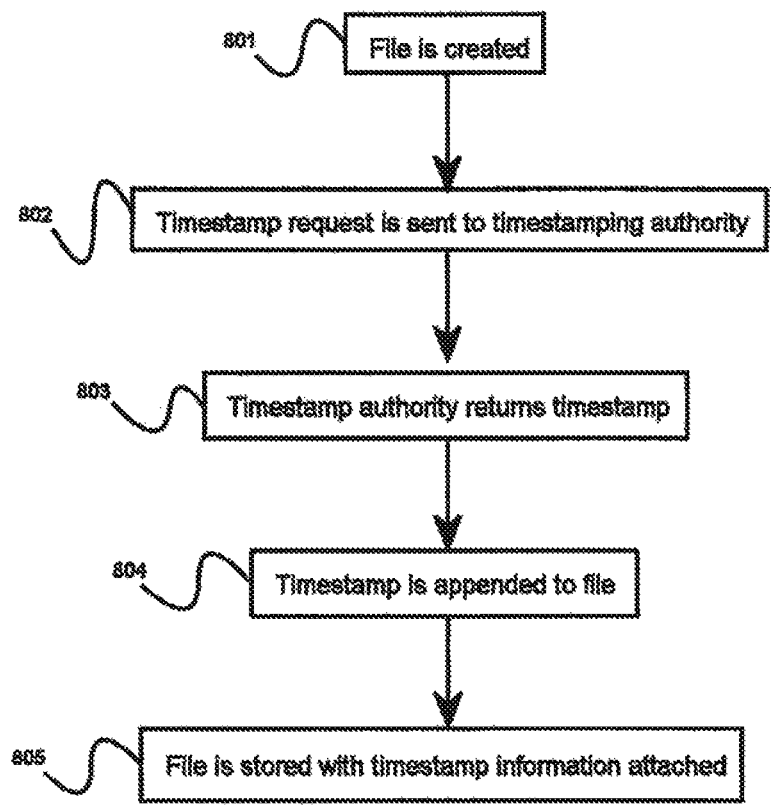
FIG. 8 is a method diagram illustrating an exemplary method for providing secure file timestamps utilizing a third-party timestamping authority, according to an embodiment of the invention.

FIG. 8 is a method diagram illustrating an exemplary method 800 for providing trusted timestamping of files using a third-party timestamping authority (TSA), as is common in the art, according to an embodiment of the invention. It should be appreciated that the specific nature of a TSA such as their particular security practices may vary according to the invention.

In an initial step 801, a file may be created as described previously, such as an audio call (or other interaction) being recorded for storage. According to the embodiment, a request may be sent to a third-party TSA in a next step 802, such as to request a trusted timestamp for a file from a disinterested third-party for security reasons (such as when a user may feel that a party responsible for storing or otherwise given access or authority over a file may have an interest in tampering with its data). Such a request may be of varied nature, such as a simple request for a timestamp confirming the time of the request (which ideally would correspond closely with the actual time of a file's creation), or may be more detailed and may include some security measures itself to ensure that timestamp requests are valid, such as sending a copy of the file being timestamped (or a hash corresponding to such a file) to the TSA for verification of the request.

In a next step 803, a TSA may return a timestamp for the file as requested, which may then be attached or appended to the file's data in a next step 804, as described previously (referring to FIG. 5). In this manner, a file may be created by one party and timestamped by a trusted third party, such that file timestamps may be eliminated as a potential security concern, in that timestamps may be assumed to be granted by a party trusted to have no interest in falsifying file information. It can be appreciated that ensuring a third-party TSA can be trusted may be a concern, and timestamping authorities exist in the art which are generally considered to be "trusted", and which may have security certifications from known providers to eliminate any reasonable doubt as to their reliability or trustworthiness.

In a next step 805, this newly-timestamped file may be stored for further access or interaction, such as further encryption or security signing as may be appropriate according to a particular implementation of the system of the invention or a particular security model being implemented. In this manner, any security model may be enhanced by the use of a trusted third-party TSA, adding an additional layer of trustworthiness and security to a file's information.

Figure 9:
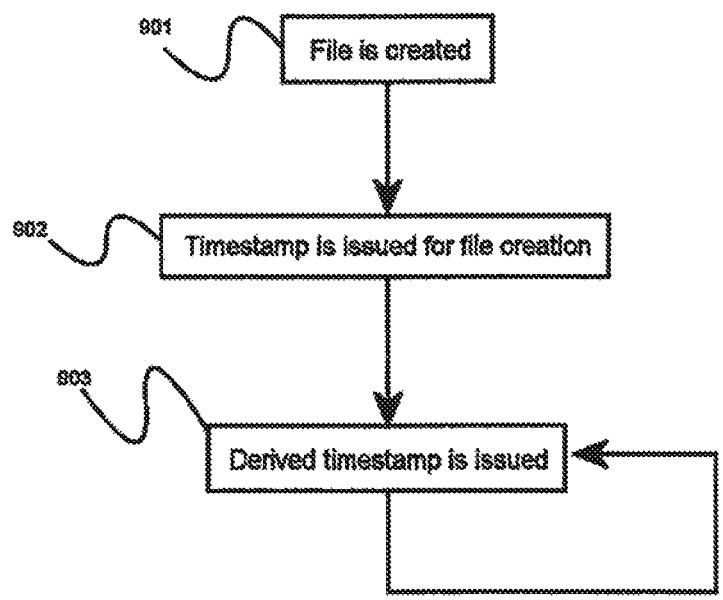
FIG. 9 is a method diagram illustrating an exemplary method for providing secure file timestamps utilizing linked timestamps, according to an embodiment of the invention.

FIG. 9 is a method diagram illustrating an exemplary method 900 for providing trusted timestamping of files, utilizing linked timestamps such that each subsequent timestamp is derived from previous ones, such that altering any single timestamp would invalid an entire timestamping "tree" or descending structure of derived timestamps, making tampering evident and thereby providing security not by preventing tampering or falsification, but by making it impossible to do so discretely and without immediately revealing the exact nature of an tampering (for example, altering a timestamp would make it apparent exactly which timestamp was tampered with, as the timestamp tree may be examined for the specific timestamp which began invalidation of all subsequent timestamps).

In an initial step 901, a file may be created as described previously. In a next step 902, a timestamp may be granted for the new file such as to record the time of the file's creation. Such a timestamp may be granted by the file's creator, or a party responsible for storage or monitoring of a file, or by a third-party TSA as described above (referring to FIG. 8), according to the specific nature of a particular embodiment. In a next step 903, a next timestamp may be issued for a same file (such as adding a timestamp to record a modification to a file), which may be derived from a previous timestamp such as that originally issued upon a file's creation, and as illustrated additional derived timestamps may be issued in repeated steps. It should be appreciated that due to the hierarchical nature of such a timestamping structure, there must be an initial timestamp from which subsequent timestamps may be derived, and that for any given newly-created file an initial timestamp must be granted. As a measure of security, rather than issue a new timestamp for each file upon creation (thus potentially creating a large number of descending timestamp structures), a file may be given an initial timestamp (as in a second step 802) that is itself derived in whole or in part from another file's timestamp. Such derivative generation may be performed according to any of a variety of means according to the invention, the key being that each timestamp is both unique and dependent on the information contained within a previous timestamp—as such, altering any single timestamp will invalidate the data or structure of a next timestamp, causing such tampering to be evident immediately. It should be appreciated that in the manner described, tampering of any particular timestamp would be potentially possible, but doing so would immediately cause obvious signs of tampering that both reveal the presence of tampering and the specific nature of the changes being performed (it would be trivially simple to view a timestamp structure and observe the point at which the structure was altered and invalidated, revealing the exact timestamp that had been tampered with).

Figure 10:
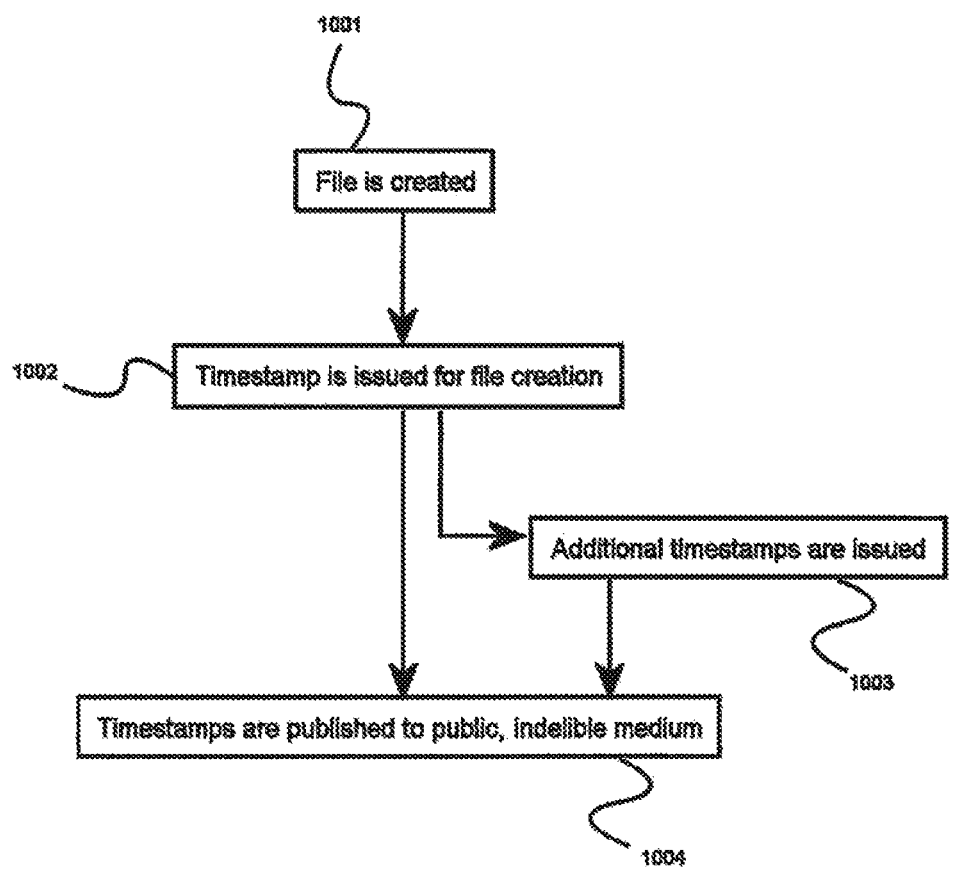
FIG. 10 is a method diagram illustrating an exemplary method for authenticating file timestamps utilizing published timestamps, according to an embodiment of the invention.

FIG. 10 is a method diagram illustrating an exemplary method 1000 for published timestamps, ensuring security through transparency by making specific timestamps or a timestamp structure (as described above, referring to FIG. 9) available in a public and difficult to falsify format, according to an embodiment of the invention.

In an initial step 1001, a file may be created as described previously, and in a second step 1002 a timestamp may be issued for such a file's creation. It should be appreciated that such a timestamp may be issued by a file creator or authorized party such as may be responsible for storing or monitoring a file, or by a third-party TSA according to a particular embodiment. In an optional step 1003, additional timestamps may be issued such as for additional files, operations performed on a file for which a timestamp may be appropriate (such as for recording times of file access or alteration), or any other timestamps that may be issued and that for which it may be desirable to ensure validity. In a next step 1004, a timestamp, group of timestamps, or a timestamp structure (such as described above, referring to FIG. 9) may be published such that the timestamps are made publicly or widely available, ensuring that any tampering would be evident to any concerned parties, and in such a format that it may be difficult or impossible to tamper with the publication directly such as to conceal tampering with the timestamps published. For example, a timestamp structure may be periodically published to an analog medium such as a newspaper or similar publication, such that it becomes effectively impossible to falsify a publication (as there are numerous copies in circulation that may be difficult or impossible to locate and alter individually, and also as it may be difficult or impossible to tamper with the publication's printing or creation), and therefore impossible to tamper with a timestamp as it is easily detectable and the medium for comparison (according to the example, a published newspaper) may be readily available and inherently trustworthy due to the difficulty in tampering with such a record.

Figure 11:
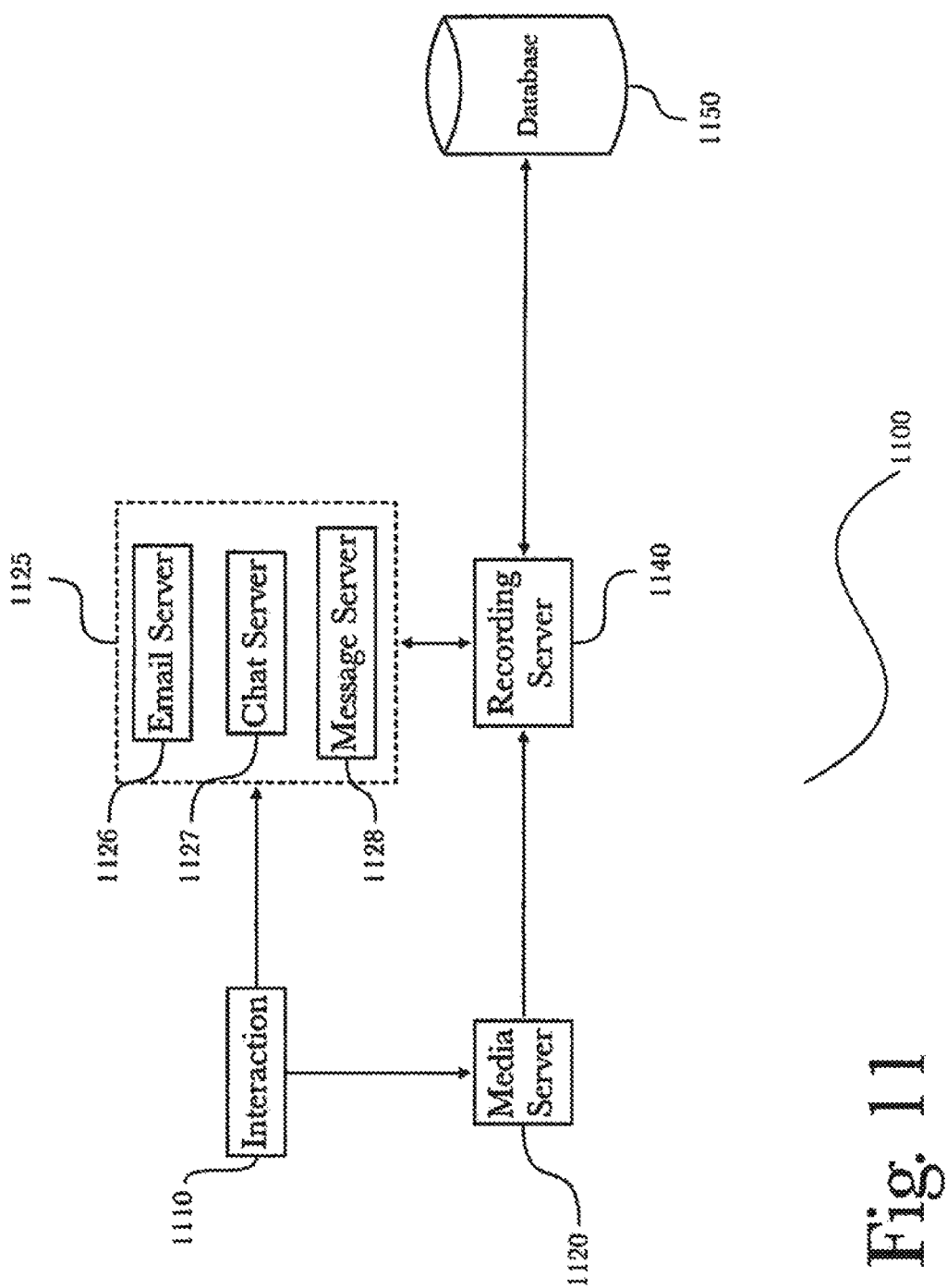
FIG. 11 is a block diagram of a conceptual architecture of a system according to a preferred embodiment of the invention.

FIG. 11 illustrates an exemplary system architecture 1100 for receiving and recording interactions, according to the invention. According to the embodiment, a plurality of interactions 1110 (only a single interaction is shown for illustrative clarity) may be delivered to a media server 1120 or any of a variety of interaction-specific handlers 1125 such as (for example) an email server 1126 such as for handling of email conversations or other email-based interactions, chat server 1127 such as to handle chat-based interactions such as any of a variety of Internet-based or other chat services or protocols (as are common in the art), or a message server 1128 such as might handle text message-based interactions such as conversations via short message service (SMS) or other common messaging services or protocols. According to the embodiment, a recording server 1140 may be utilized such as to communicate with various interaction handlers 1125 for such purposes as (for example) receiving interactions for recording (such as receiving and recording a telephone call), or to communicate with a media server 1120 such as to receive media communications for recording (such as audio or video media content). Recordings may be stored in a database 1150, which may be any of a variety of data storage means such as hardware-based integral or removable storage media (such as optical storage discs or magnetic storage drives), or software-based storage schema such as SQL™ or other database schema, as are common in the art. Additionally, it should be appreciated that as illustrated previously a timestamping authority (not illustrated) may communicate with a recording server 1140 such as to provide timestamping information for recordings (such as verifying and recording the time when a recording operation begins or completes).

Figure 12:
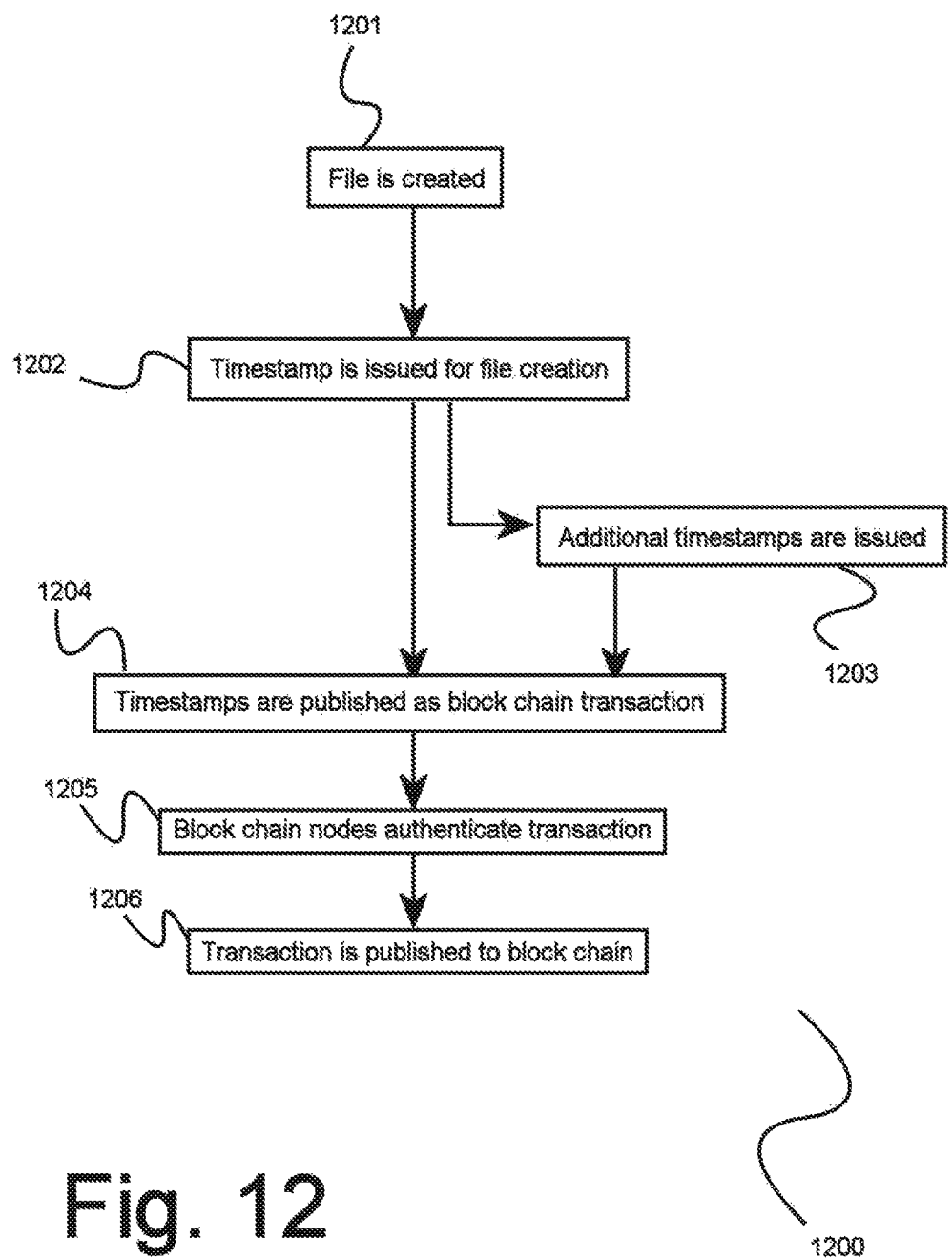
FIG. 12 is a method diagram illustrating an exemplary method for publishing timestamps using a public block chain.

FIG. 12 is a method diagram illustrating an exemplary method 1200 for publishing timestamps using a public block chain, ensuring security through transparency by making specific timestamps or a timestamp structure (as described above, referring to FIG. 9) available in a public and difficult to falsify format, according to an embodiment of the invention.

In an initial step 1201, a file may be created as described previously, and in a second step 1202 a timestamp may be issued for such a file's creation. It should be appreciated that such a timestamp may be issued by a file creator or authorized party such as may be responsible for storing or monitoring a file, or by a third-party TSA according to a particular embodiment. In an optional step 1203, additional timestamps may be issued such as for additional files, operations performed on a file for which a timestamp may be appropriate (such as for recording times of file access or alteration), or any other timestamps that may be issued and that for which it may be desirable to ensure validity. In a next step 1204, a timestamp, group of timestamps, or a timestamp structure (such as described above, referring to FIG. 9) may be published to a block chain, optionally as a transaction record or as metadata attached to a zero-sum transaction record (for example, alternating records of equal, small deposits and withdrawals), wherein data is stored in a distributed manner across many redundant nodes across a network (for example, computers connected via the Internet). In a next step 1205, a plurality of block chain nodes may authenticate a transaction record associated with a plurality of timestamps. In a block chain, nodes maintain data according to a "general consensus" architecture, and data is continually updated and validated between nodes to prevent tampering or falsification (for example, forged data or other forms of data vandalism). Timestamp information (for example, individual timestamps, groups of timestamps, or a timestamp structure) may be published to a block chain after authentication in a final step 1206 to ensure it is stored in a tamper-resistant public medium, ensuring the data remains reliable and accessible. In this manner, timestamps may be published immediately or periodically in any of a number of arrangements according to the invention, facilitating a degree of security and insurance against tampering by making any such tampering immediately and verifiably evident to any concerned parties. At a later time when a timestamp is needed, any participating node (for example, a timestamping authority that publishes to a block chain) will already have a full copy of the block chain up until that point in time, and may simply refer to a desired point in time in the transaction history to retrieve a particular record. Records that appear in the transaction history were implicitly authenticated by other nodes as per block chain operation, so if a record does not match the stored copy in the block chain upon comparison then it may be assumed that the record has been tampered with or falsified.

Figure 13:
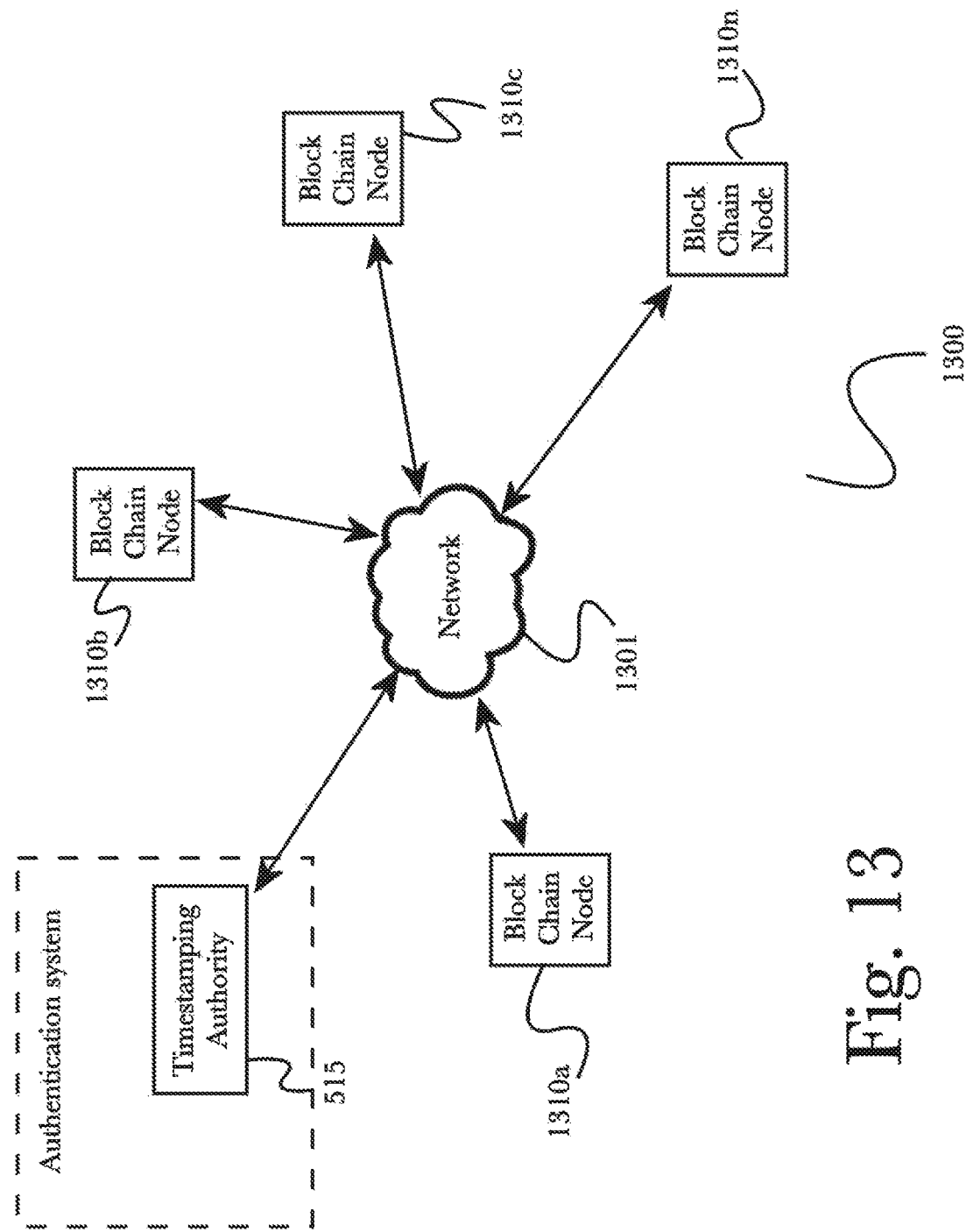
FIG. 13 is a block diagram of an exemplary alternate system architecture utilizing block chain nodes for verification and publishing, according to a preferred embodiment of the invention.

FIG. 13 is a block diagram of an exemplary alternate system architecture 1300 utilizing block chain nodes for verification and publishing, according to a preferred embodiment of the invention. According to the embodiment, an authentication system 424 may be configured to participate in a block chain system over a network 1301 comprising a plurality of nodes 1310*a-n*, with a timestamping authority 515 (as described previously) serving as a node participating in the block chain system. Timestamping authority 515 may produce and publish timestamp information to a block chain by providing the information to a plurality of connected nodes 1310*a-n*, and nodes may then verify the information by general consensus according to a standard block chain operational model. For example, nodes may compare transaction records with one another to determine whether a particular transaction has been tampered with or falsified, or to ensure that any associated metadata (such as, for example, timestamp records associated with a zero-sum transaction) matches. According to a block chain operational model, each nodes maintains a complete up-to-date copy of the entire block chain and thus when a timestamp record is retrieved, timestamping authority 515 need only consult its own copy of the block chain for the relevant record, without the need for a network connection at that time. A current copy of the block chain may be considered valid, as any discrepancy would be immediately discarded the next time any information was exchanged with other nodes, and any transactions based on erroneous information would in turn be discarded by other nodes and would not be propagated throughout the block chain record. In this manner, a block chain may be considered a distributed indelible medium suitable for publishing information with authority to prevent tampering and ensure availability when needed at a later time.

It should be appreciated that the various security models and methods described above may be combined in various ways with each other as well as with additional or alternate security methods, such that each approach to security may be considered a modular component in a larger security paradigm that may incorporate multiple methods to facilitate a desirable level or particular manner of secure operation. It should be further appreciated that additional or alternate means may be utilized according to the invention to achieve the security goals presented, and that due to the nature of the art security means may be developed or modified at any future time and utilized according to the invention, facilitating a flexible and "future proof" security model addressing multiple concerns and providing a variety of secure features for users.

It should be further appreciated that while the systems and methods described herein may be described with particular relation to call recording or similar audio file creation and storage, the ideas and methods presented may be easily applied to any form of digital content for which it may be desirable to facilitate security against tampering according to the various methods and approaches described. It should be further appreciated that additional or alternate components may be utilized according to the invention with regard to any particular element described, as the nature of the invention relates to the functions being performed and not the specific nature of any particular element utilized to facilitate provision of such functionality.

The skilled person will be aware of a range of possible modifications of the various embodiments described above. Accordingly, the present invention is defined by the claims and their equivalents.

What is claimed is:

1. A system for securely recording voice communications, comprising:
    a network-connected computer server comprising a memory, a processor, and a first plurality of programming instructions stored in the memory which, when executed by the processor, causes the network-connected computer server to:
        receive an interaction via a network, the interaction comprising a plurality of conversations each comprising one or more of the following media types: audio, video, email, and short message service (SMS);
        generate a recording of the interaction;
        receive a timestamp and hash of the recording as a first part of an authentication process of the recording;
        encrypt the recorded interaction with the timestamp embedded therein using the received hash;
        publish the timestamp to a block chain as a zero-value block chain transaction as a second part of the authentication process of the recording; and
        store the encrypted interaction recording in a secure database.

2. The system of claim 1, wherein the authentication process is performed by an authentication system comprising a second plurality of programming instructions stored in the memory which, when executed by the processor, causes the network-connected computer server to:
    receive the recording;
    generate the timestamp; and
    generate the hash of the recording.

3. The system of claim 2, wherein the authentication system is further configured to verify that the timestamp has not been tampered with.

4. The system of claim 3, wherein authentication system is further configured to
    verify that the timestamp has not been tampered with by validating the zero-value block chain transaction for the recording.

5. A method for securely recording voice communications, the method comprising the steps of:
    receiving, at a network-connected computer server comprising a memory, a processor, and a first plurality of programming instructions, an interaction via a network, the interaction comprising a plurality of conversations each comprising one or more of the following media types: audio, video, email, and short message service (SMS);
    generating, by the network-connected computer server, a recording of the interaction;
    receiving a timestamp and hash of the recording as a first part of an authentication process of the recording;
    encrypting the recorded interaction with the timestamp embedded therein using the received hash;
    publishing the timestamp to a block chain as a zero-value block chain transaction as a second part of the authentication process of the recording; and
    storing the encrypted interaction recording in a secure database.

6. The method of claim 5, further comprising the step of performing the authentication process using an authentication system comprising a second plurality of programming instructions operating on the network-connected computer server, which:
    receives the recording;
    generates a timestamp; and
    generates a hash of the recording.

7. The method of claim 6, further comprising the step of verifying, using the authentication system, that the timestamp has not been tampered with.

8. The system of claim 7, further comprising the step of
    verifying, using the authentication system, that the timestamp has not been tampered with by validating the zero-value block chain transaction for the recording.

* * * * *